(12) United States Patent
Gupta et al.

(10) Patent No.: US 12,086,588 B2
(45) Date of Patent: *Sep. 10, 2024

(54) APPLICATION MODULE VERSION MANAGEMENT

(71) Applicant: Microsoft Technology Licensing, LLC, Redmond, WA (US)

(72) Inventors: Akhil Gupta, Redmond, WA (US); Abhinav Jha, Redmond, WA (US); Prabhat Kumar Pandey, Redmond, WA (US); Abhishek Agarwal, Redmond, WA (US); Yasser Shaaban, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/161,425

(22) Filed: Jan. 30, 2023

(65) Prior Publication Data

US 2023/0251855 A1 Aug. 10, 2023

Related U.S. Application Data

(63) Continuation of application No. 17/353,463, filed on Jun. 21, 2021, now Pat. No. 11,599,355.

(51) Int. Cl.
*G06F 8/71* (2018.01)
*G06F 8/41* (2018.01)

(52) U.S. Cl.
CPC ................ *G06F 8/71* (2013.01); *G06F 8/433* (2013.01)

(58) Field of Classification Search
CPC .................................. G06F 8/71; G06F 8/433
See application file for complete search history.

(56) References Cited

U.S. PATENT DOCUMENTS 5,603,027 A * 2/1997 Ohkami ............. G06F 9/44536
717/170
6,195,796 B1 2/2001 Porter
(Continued)

OTHER PUBLICATIONS

"International Search Report and Written Opinion Issued in PCT Patent Application No. PCT/US22/029081", Mailed Date: Aug. 26, 2022, 11 Pages.
(Continued)

*Primary Examiner* — Douglas M Slachta
(74) *Attorney, Agent, or Firm* — Holzer Patel Drennan

(57) ABSTRACT

Versions of an application are managed by receiving a request for a version of an application, retrieving, responsive to the received request, a version of a master application component based at least in part on version data that associates a version of the master application component with the version of the application, retrieving a relationship operable to relate the version of the master application component with a corresponding version of a first component on which the master application component depends for a function of the application, retrieving the corresponding version of the first component, responsive to the retrieving of the relationship, assembling the version of the application based at least in part on the retrieved version of the master component, the retrieved relationship, and the retrieved first component, and providing for an execution of the assembled version of the application.

18 Claims, 13 Drawing Sheets

(56) References Cited

U.S. PATENT DOCUMENTS

| | | | |
|---|---|---|---|
| 7,340,715 B2* | 3/2008 | Liu | G06F 8/34 |
| | | | 717/109 |
| 7,478,381 B2* | 1/2009 | Roberts | G06F 8/65 |
| | | | 707/999.203 |
| 8,621,433 B2* | 12/2013 | Back | G06F 8/71 |
| | | | 717/169 |
| 9,063,817 B2 | 6/2015 | Dorn et al. | |
| 9,400,645 B2* | 7/2016 | Mahajan | G06F 8/43 |
| 9,417,870 B2 | 8/2016 | Bankole et al. | |
| 9,547,579 B1* | 1/2017 | Shen | G06F 11/3624 |
| 9,678,728 B1 | 6/2017 | Shemer et al. | |
| 9,690,553 B1* | 6/2017 | Brodie | G06F 8/71 |
| 10,114,637 B1 | 10/2018 | Willson et al. | |
| 10,379,846 B1 | 8/2019 | Mercille et al. | |
| 10,620,937 B1 | 4/2020 | Bross et al. | |
| 2003/0182652 A1 | 9/2003 | Custodio | |
| 2004/0103393 A1 | 5/2004 | Reddy et al. | |
| 2007/0006222 A1 | 1/2007 | Maier et al. | |
| 2007/0050762 A1 | 3/2007 | Chen et al. | |
| 2008/0256393 A1* | 10/2008 | Ur | G06F 11/3616 |
| | | | 714/38.1 |
| 2011/0099543 A1 | 4/2011 | Thorley et al. | |
| 2011/0321028 A1* | 12/2011 | Evans | G06F 8/61 |
| | | | 717/170 |
| 2014/0053135 A1* | 2/2014 | Bird | G06F 8/71 |
| | | | 717/124 |
| 2014/0173574 A1* | 6/2014 | Schmidt | G06F 8/43 |
| | | | 717/143 |
| 2014/0298290 A1* | 10/2014 | Klinger | G06F 8/71 |
| | | | 717/121 |
| 2015/0033212 A1* | 1/2015 | Mizobuchi | G06F 11/3688 |
| | | | 717/131 |
| 2015/0268948 A1 | 9/2015 | Plate | |
| 2015/0355900 A1* | 12/2015 | Crosby | G06F 8/654 |
| | | | 717/168 |
| 2016/0117161 A1* | 4/2016 | Parthasarathy | H04L 67/06 |
| | | | 717/171 |
| 2016/0162286 A1* | 6/2016 | Bankole | G06F 8/65 |
| | | | 717/170 |
| 2016/0170739 A1* | 6/2016 | Kapashikov | G06F 9/44521 |
| | | | 717/168 |
| 2017/0235661 A1* | 8/2017 | Liu | G06F 8/443 |
| | | | 717/106 |
| 2017/0357494 A1* | 12/2017 | Owin | G06F 8/65 |
| 2017/0371649 A1 | 12/2017 | Li et al. | |
| 2018/0253296 A1 | 9/2018 | Brebner et al. | |
| 2018/0307591 A1* | 10/2018 | Lin | G06F 11/3672 |
| 2019/0317754 A1 | 10/2019 | Mosquera et al. | |
| 2022/0405093 A1 | 12/2022 | Gupta et al. | |

OTHER PUBLICATIONS

"Backward Compatibility in Appian", Retrieved from: https://web.archive.org/web/20200919164451/https://docs.appian.com/suite/help/20.2/backward-compatibility.html, Sep. 19, 2020, 4 Pages.

"Setting up a Development Environment", Retrieved from: https://web.archive.org/web/20150323144811/https:/developer.wordpress.org/themes/getting-started/setting-up-a-development-environment/, Mar. 23, 2015, 6 Pages.

* cited by examiner

APPLICATION MODULE VERSION MANAGEMENT

CROSS-REFERENCE TO RELATED APPLICATIONS

The present application is a Continuation of and claims benefit of priority to U.S. patent application Ser. No. 17/353,463, filed Jun. 21, 2021, and entitled "Application Module Version Management," which is specifically incorporated by reference for all that it discloses and teaches.

BACKGROUND

Providers provide applications developed by contributors such as producers, independent software vendors (ISVs), and third-party application developers. The contributors contribute applications, application modules (AppModules), and other application components for developing the applications. Different contributors can modify these components, and the components can be even further modifiable or customizable by users or administrators of user systems. This can provide a complex web of dependencies between versions of applications and application components.

SUMMARY

The described technology provides implementations of systems and methods for managing versioning data. More specifically, the described technology provides implementations of systems and methods for application module version management.

A method of managing versions of an application using AppModule data arranged in component node and component edge data objects is provided. The method includes receiving a request for a version of an application, retrieving, responsive to the received request, a master application component based at least in part on version data in a component node data object that associates the master application component with the version of the application, retrieving an edge relationship from a component edge data object, wherein the edge relationship is operable to relate the master application component to a corresponding version of the first component on which the master application component depends for a function of the application, retrieving the corresponding version of the first component, responsive to the retrieving of the first edge relationship, and providing the version of the application based at least in part on the retrieved master application component, the retrieved corresponding first component, and the retrieved first edge relationship.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTION

Figure 1:
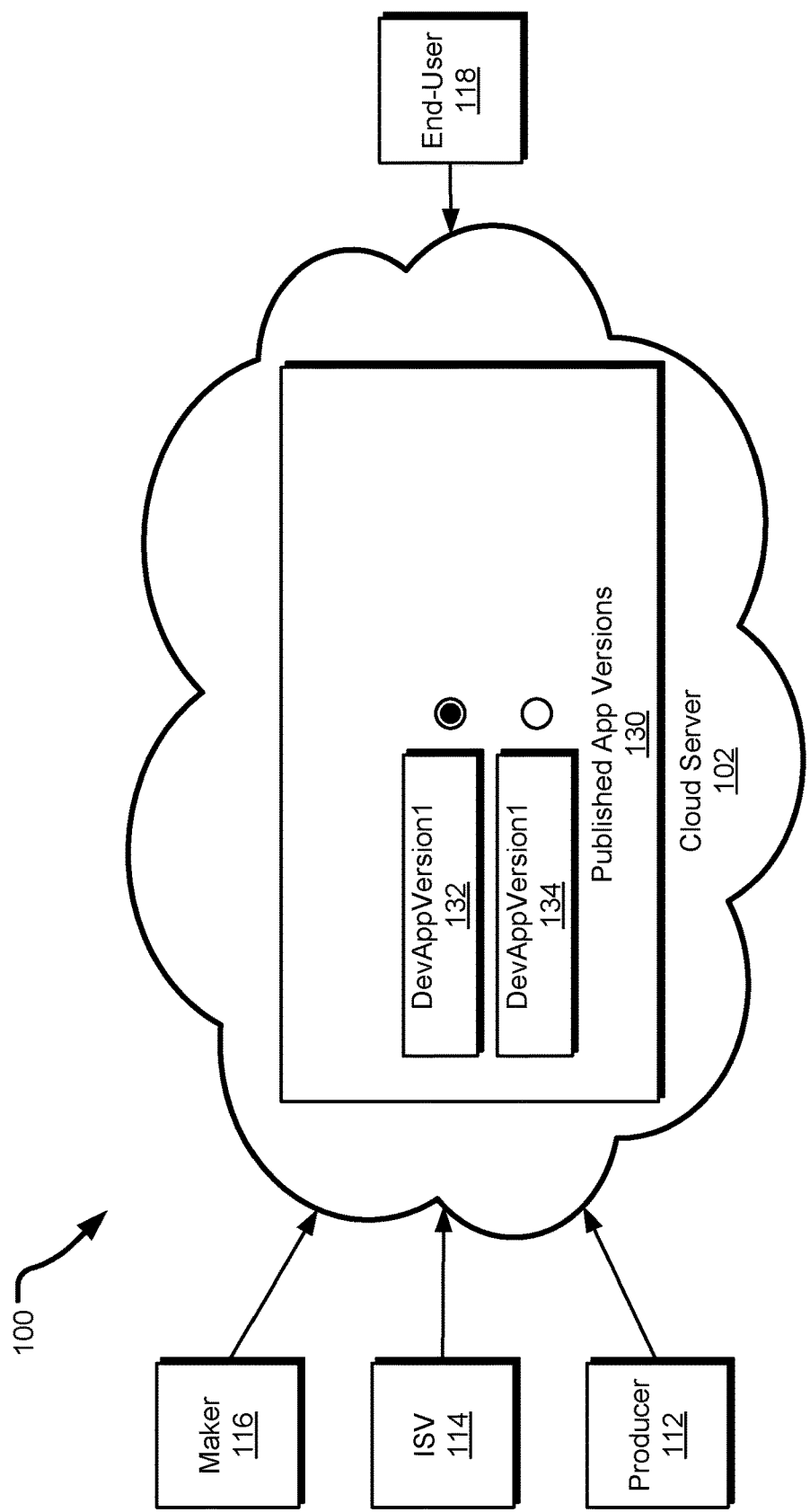
FIG. 1 illustrates an example system for application module version management.

Software versioning and updates can be complicated even if only controlled by one entity. Modern applications often have different levels of contribution, with many applications and components transitioning towards dependency-laden, object-oriented, higher-level applications. Because any of the contributors (elements of a contribution hierarchy) could potentially modify elements of an application, the likelihood that an update to a component or application infrastructure will cause errors in the application can be higher than for systems controlled by a single entity.

Versioning can be complicated by this hierarchy of contributors, and any contribution at any level can affect compatibility and functionality of an application and its constituent components. Additionally, keeping different versions of every level of contribution can occupy a considerable amount of space and can complicate relationships between current versions of an application in a client and other updated versions provided by different players in the contribution hierarchy. When an update is received from any contribution level of the hierarchy, the update might not function correctly with an existing implementation of an application. Importing the update without checking for errors can result in a malfunctioning application. Delaying an update can potentially cause issues if the provider of the update does not account for dependencies in past versions when modifying existing application components, perhaps making the prior versions of the components unavailable.

The contribution hierarchy can be especially difficult with offline systems. The offline systems can be configured to interact with online systems less frequently, potentially complicating the versioning and updating process for the application and constituent components. Periodic updating can also make the issues more difficult to identify and preempt.

In some systems, offline metadata consumption for an application or component thereof (AppModule) can start when selected by a client. In this specification, the terms, application and AppModule, are used interchangeably to represent an executable function. If this is the first time the client requests metadata for the app, a Get Client Metadata (GCM) call can be made to download a list of all the component's IDs whose metadata is needed for the application to function. Once this list of Component IDs is returned to the client, the client can make calls to retrieve the metadata for these IDs in batches. Behind the scenes, to service the above GCM request for offline, the application might need to generate the metadata and cache the list of component identifiers (IDs) that it will return in response of the GCM-Offline call. The data can be organized into two data entities, one that contains the AppModule tree structure (e.g., perhaps to a level of sub-entity and/or elements that can be added to the AppModule through the app designer) and a second that contains a list of all the dependencies for each of the components in the AppModule Tree (e.g., including elements at a lower level than the components that are directly contributable to the AppModule). An example can include an AppModule with AppModule Metadata cache, on top of which role-based filtering can be applied to form the response to the GCM call. Limitations of this system can include that the metadata generation can happen each time any component is published. The previously computed metadata can be deleted, and new metadata can be generated for all the offline enabled AppModules from scratch. This can be both slow and a waste of computation resources and can cause superfluous strain on servers (e.g., especially servers for asynchronous updates).

In accordance with the presently described technology, the application data can be versioned and arranged to simplify transitioning between versions of an AppModule. The AppModule data can be arranged and stored in different data entities to allow for efficient versioning. For example, the AppModule data can include a data object that stores information regarding components. In an implementation, the data object for storing information regarding components is a component node data object. The AppModule data can also include a data object that stores information regarding relationships between components. In an implementation, the data object that stores the information regarding relationships is a component edge data object. Although described in this specification in terms of nodes and edges, the type of data stored and manner in which the data is stored in these objects might not track mathematical interpretations of or analogies to nodes and edges. The component node data object can identify component data objects and can store version data of the component themselves and metadata used for functionality of the components and/or validation of the compatibility of application components (e.g., dependencies and prefetched data for the components). The component edge data object can store data that relates or otherwise associates application components. The component node data object and the component edge data object can provide instances (snapshots) of the application at each version update.

When a client requests a version of the application, the version of the application can be assembled or marshaled from the component node data object and the component edge data object by a providing entity. The application can be assembled beginning with a master application component specific to the version of the application. The master application component can be fetched along with its metadata by referencing the component node data object. The system can then fetch components upon which the master application component depends using the relationships and/or associations stored in the component edge data object. The component edge data object can store specific dependency relationships. Data including version-specific data of the component and associated metadata can be derived from the component data node object. The components associated with the master application component can have further sub-components upon which the components depend. Data including version-specific data of the sub-components and associated metadata can be derived from the sub-component data in the component node data object. This process can also be applied to sub-components of sub-components until the entire application is assembled from constituent components. The assembling or marshaling of components can be done in a direction of increasing dependency or according to another hierarchy of relationships. For example, the master component can depend on a different component (e.g., a child component) for a function of the application. The component can depend on a sub-component (e.g., child of a child component, grandchild component, or descendant/progeny component) for a function of the component. The assembly or marshaling of the application can be conducted in an order from master application component to different component to sub-component.

A branch of components along a dependency chain can be considered a dependency branch. When an updated version of an application is submitted, a different component (e.g., a new component or a different version of a component) that was not present in the prior version of the application can be submitted. Consequently, the components (e.g., parent/ancestor components) that depend on the different component can be considered elements of a modified dependency branch. The different component can be validated in terms of its compatibility with other elements, perhaps based at least in part on metadata associated with the new component. Because other dependent components that depend on the different component for a function of the application might have changed functionality as a result of the different component, the system can validate and update AppModule data for each of the dependent components, perhaps in a direction of increasing dependency (e.g., from lower to higher in the analogy of genealogy of components). In implementations, the component node data object can store data, including versioning and metadata, associated with each component along the dependency branch, including the different component. The edge node data object can be updated to include the relationships between the different component, the new versions of the existing dependent components, and any other components. Each version of the application can have a different version of the master application component, with different data in the component node data object and the component edge data object. If some dependency branches remain unmodified between application versions, the AppModule data for the unmodified dependency branches can remain substantially unchanged except to the extent of the relationship between the highest node of the unmodified branch and a component of the modified components to which the unmodified dependency branch provides functionality. For example, if a new master application component version is created during an update, a reference between the new version of the master application component and a component of an unmodified dependency branch can be stored in the component edge data object.

Because the component versions and associated metadata are stored in the node component data object and because the relationships between the component versions are stored in the component edge data object, every version of the application can be frozen or snapshotted using these objects. This can reduce the amount of redundant data that needs to be stored to keep all versions and also can simplify the process of updating and providing versions of the application. It can also ensure that updated AppModule data does not affect compatibility. For example, the validating of components in a dependency branch can prevent availing an update that is not compatible with elements of an existing application instance, perhaps reducing or eliminating downtime for the application. Further, it can allow for greater customization by users and/or user administrators by ensuring that new components function with older components.

When receiving a version update for the application from a developer, the system can determine the difference between the new version and the existing version. The difference can include different components. The AppModule data can be modified as presented using the component node data object and component edge data object.

Implementations are contemplated in which the versions of the applications are stored and implemented in different forms of the client system. For instance, the client can be stored in a multitenant server database, perhaps with a separate partition or virtual machine for each client tenant. In other implementations, the client system is a separate device, perhaps an offline device, such that updates to the application instance on the client system can be periodically updated or updated when connectivity allows. The client system can be controlled by any of the entities in the contribution hierarchy.

The application can be provided by the entity that controls the AppModule data, a providing entity. The providing entity can be associated and/or controlled by one or more of the contributors or can be a separate third-party entity that controls the AppModule data. The application can be provided as an executable file, as a difference data object that provides data needed to update an existing version of the application, or the application might not be a discrete application but an assembly of instances of components that operate based at least in part on the data stored in the component node data object and the component edge data object.

In an implementation in which the application is stored on a client memory device other than a memory device of the providing entity, for instance, an off-site and/or offline computing device, the client memory device can have a version of the application or might not yet have the application. In implementations in which the client device already has a version of the application, the request can be for an update to a new version of the application or to reverse an update to go to a prior version of the application. In this implementation, the providing entity can provide a full version of the requested application or can provide data representing a difference between the currently installed version and the requested version of the application. In an implementation where the difference is provided, the request can have initially included data regarding the version that was already installed in the client.

In a network-based implementation, the application instances are stored in a networked memory device and accessible by a client over the cloud. The storage can be controlled by the providing entity or a different entity, either of which can be associated with or controlled by one of the contributors. In this implementation, the applications can be stored in general storage of the storing entity or can be in specific memory and/or software space for the application and/or the client. In the network-based implementation, the program instances or versions can be saved as executable functions. In an alternative implementation, the AppModule data can include references to instances of compiled and associated components such that no specific instances of executables or program modules are compiled to form a separate program instance. In this implementation, the networked memory device merely communicates data between instances of components without assembling the instances of versions of the applications.

FIG. 1 illustrates an example system 100 for application module version management. The system 100 has a cloud server 102 with a repository of published application versions 130. Contributions to different application instances including versions 132 and 134 can be made by any contributor in a contribution hierarchy. The contributors can include one or more of a maker 116, an ISV 114, and a Producer 112. In implementations, an end-user 118 or administrator thereof can also customize modify an application.

The versions of the application can exist as related metadata that is not assembled until a version of the application 132, 134 is requested. For example, AppModule data can be stored in component node data object and component edge data objects. In an implementation, data for assembling different versions of an application is stored in a combination of a single component node data object and a single component edge data object. When a selection for a version of an application is made (as illustrated with radio buttons), the system 100 can reference a component node data object and an associated component edge data object to determine the component to be used and the relationship between the components.

When any contributor makes a contribution, AppModule data can be stored for a new version of the application. In an implementation, the contribution includes a different component different from components in the prior version. The different component can have dependencies, and the system can validate whether the different component will function with the application. The component can have associated metadata that includes the dependency data to be validated. If validated, a new data entry can be added to the component data object, perhaps including versioning data for the component (e.g., if it is a new component, version one, and if it is a new version of an existing component, the next version of that component) and the associated metadata. If a component in the application depends on the different component, it can also be validated to determine compatibility. If the dependent component is validated, the dependent component can get a new version entry in the node component data object that includes metadata for the new version and versioning data of the new version of the dependent component, and a relationship between the different component and the new version of the dependent component can be stored in the component edge data object. This procedure can be repeated for all parent components that depend on each component until an entire dependency branch is updated. This might involve making a new master application component for the version of the application. A master application component is a reference component from which a particular version of the application is derived. Each version master application component can have an entry in the component node data object with associated versioning data and other metadata. When a request for a version of the application is made, the version of the application can be referenced using the master application component. The validating can be done in a direction of increasing dependency (e.g., from the different component, to successively more dependent components, perhaps all the way to the master application component). New versions of existing components with associated versioning data and metadata can be stored in the component node data object. The relationships between the different component and the new versions of existing dependent components can be stored in the component edge data object. The component edge data object can also store new associations between unmodified branches of the components and changed dependent components.

A requestor (e.g., an end-user or administrator thereof) can transmit a request for a different version of an application. When the request is made, the system 100 can reference the AppModule data. The requestor can see the versions as assembled in the user interface, but, in implementations, the AppModule might not include assembled applications. The AppModule has data including a component node data object and a component edge object. The system 100 references a master application component associated with the version of the application requested in the component node data object. The component node data object has metadata associated with the master application component and can begin assembling the component. The system 100 then can reference the component edge data object to determine components on which the master application component depends for a function of the application and load data (e.g., versioning data and component metadata) for the components from the component node data object. This can be continued down a chain or branch of dependency as determined from the relationships stored in the component edge data object, perhaps in a direction of decreasing dependency.

Figure 2:
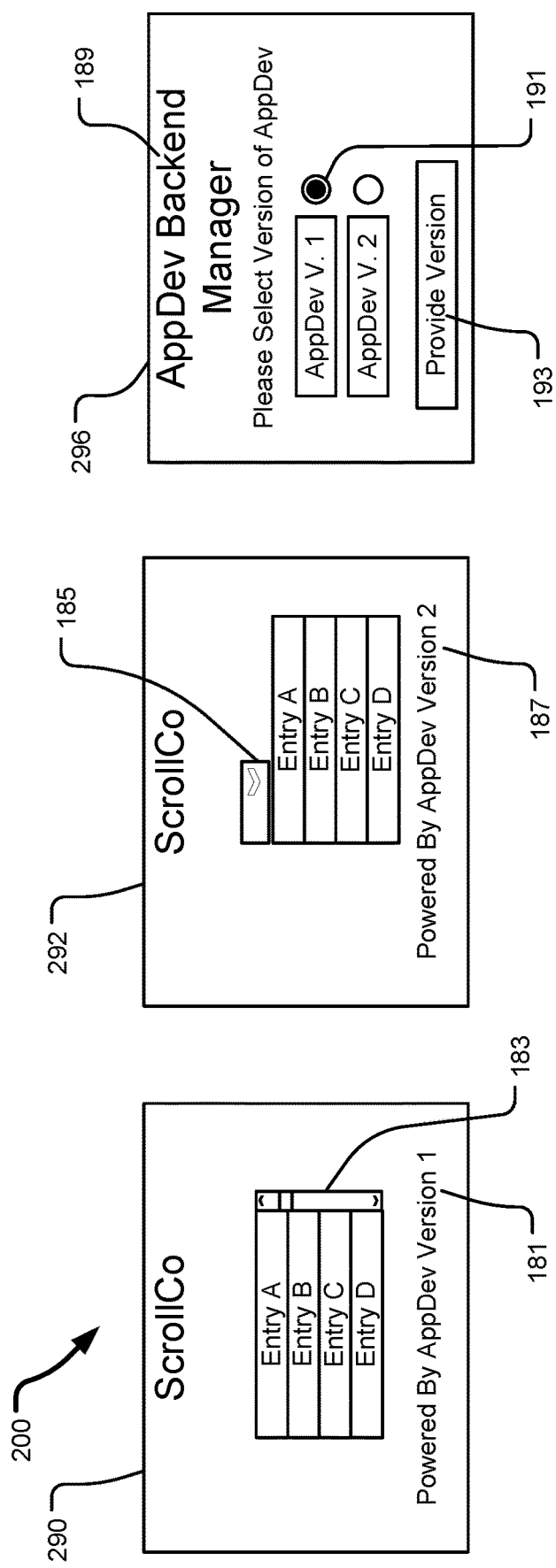
FIG. 2 illustrates another example system for application module version management.

FIG. 2 illustrates another example system 200 for application module version management. In this implementation, a maker makes an application called DevApp. A user entity, ScrollCo, uses the AppDev to power its application. ScrollCo prefers using scroll controllers to other methods of browsing control. In user interface 290, a message 181 indicates that the AppDev version ScrollCo uses is AppDev Version 1. ScrollCo has a scrollbar 183 to browse through entries A-D. In user interface 292, a message 187 is illustrated, indicating that a new AppDev version has been installed, AppDev version 2. In user interface 292, the new controller is a drop-down menu 185. ScrollCo does not like using drop-down menus. It prefers scroll controllers. In user interface 296, a backend manager 189 is provided to allow for a prior version of DevApp to be used. Because ScrollCo prefers the scrollbar 183, a user or user administrator selects radio button 191 to select AppDev Version 1 and requests that the version be provided using button 193. The system 200 can then revert to providing the user interface 290 with the scrollbar.

Figure 3:
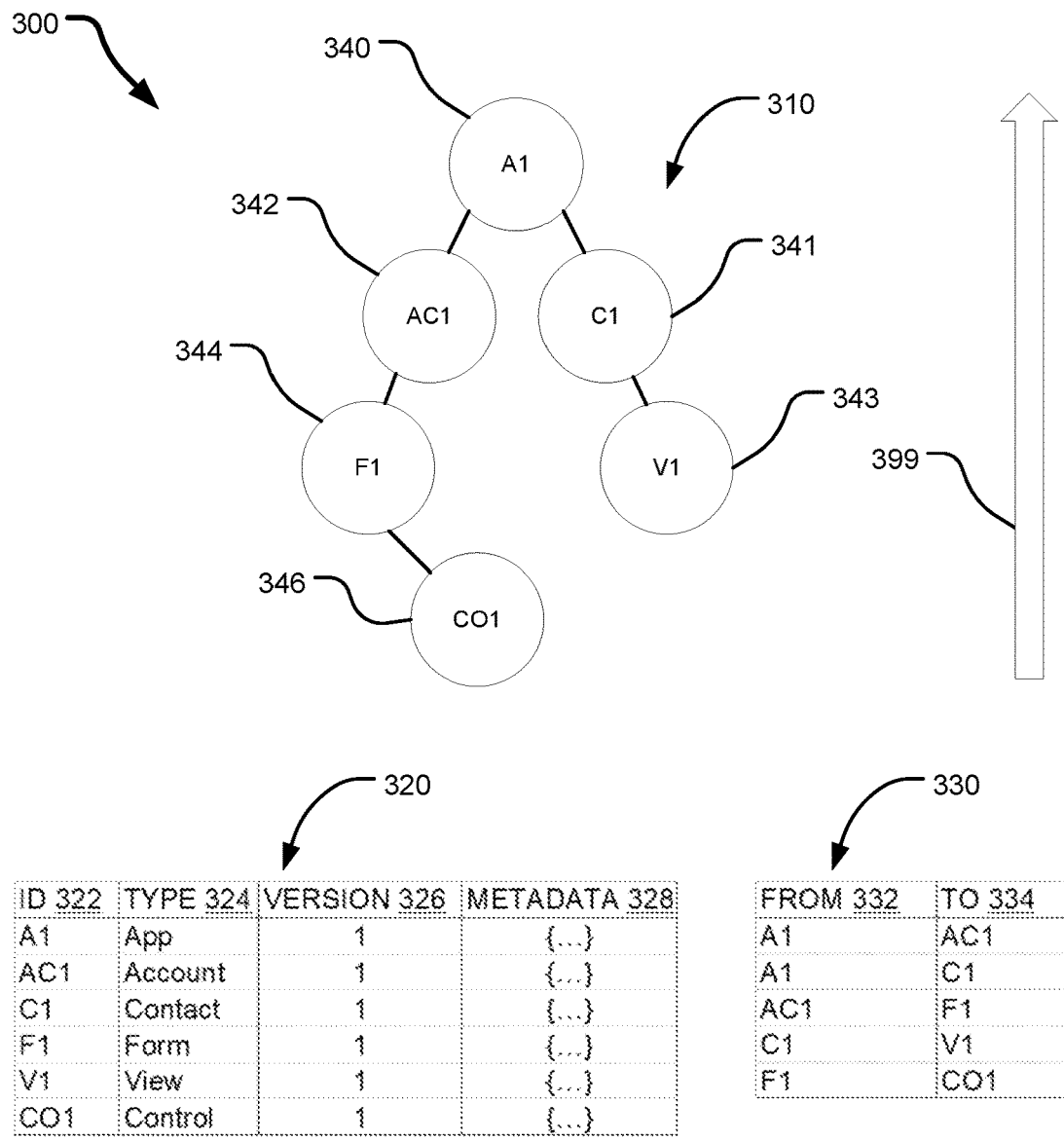
FIG. 3 illustrates an example of a system for application module version management.

FIGS. 3-8 illustrate an example of a progression of an update from a first version to a second version of an application. Specifically, FIG. 3 illustrates an example of a system 300 for application module version management. The system 300 includes a graphical dependency representation 310, a component node data object 320, and a component edge data object 330. Although illustrated as tables for the purpose of demonstration, any data structure that can relate the data described is contemplated. The component node data object has fields (illustrated as columns) including identifier (ID) 322, TYPE 324, VERSION 326, and METADATA 328 fields. The entries illustrated as rows are each associated with a component and its version. The ID field 322 can include a specific reference to a version of a component, perhaps a unique identifier. The TYPE field 324 identifies the type of component. Examples of types of components include Application (App, perhaps used to identify a master application component, and perhaps a point of initial reference for a version of an application in the component node data object), Account (e.g., a specific user account or accounts for customers), Contact (e.g., a form for storing contact information), Form (e.g., a form having specific fields for data entry), View (e.g., a user interface element), and Control (e.g., a type of controller like a scrollbar). The VERSION field 326 can indicate the version of the component. A new version of a component can get a higher version number. A first version of a component can be version one. System 300 shows a first version of the application, so all of its components are shown as version one. The Metadata field 328 can provide metadata for each component, the metadata perhaps including dependency and other data for validating the component as well as other data for assembling and/or executing the application. Other examples of metadata that may be stored in the metadata field include a form type component entry with a layout of a form (e.g., that may feed an address from a JavaScript Object Notation object) or a control layout (e.g., one that uses metadata in Extensible Markup Language format).

The component edge data object 330 is a data object that relates versions of components. In the illustrated implementation the relationships are expressed in FROM 332 and TO 334 columns. The relationships in this implementation are expressed from parent components to child components, where the parent components rely on child components for a function of the application. In this implementation, the IDs from the ID field 322 are used to express the relationships between components as identified in the component edge data object 330.

The illustrated graphical dependent representation 310 illustrates the dependency relationships of the components 340-346. The arrow 399 shows a direction of increasing dependency. The first version of the master application node (A1) 340 is the most dependent component, as it relies on all other components to perform functions of the application. As illustrated in the component edge data object 330, A1 340 has a direct dependency relationship with AC1 342 and C1 341. AC1 342 has a dependency relationship with F1 344. F1 344 has a dependency relationship with CO1 346. C1 341 has a dependency relationship with V1 343. The component node data object 320 and the component edge data object 330 have sufficient information to provide an instance (snapshot) of the first version of the application, as represented in the graphical dependent representation 310.

If a requestor makes a request for the first version of the application, the system 300 can retrieve and/or point to the A1 340 master application component. The system 300 can load metadata associated with A1 340 from the component node data object 320. The system 300 can then refer to the component edge data object 330 to determine that A1 340 depends directly on components AC1 342 and C1 341. The system 300 can then fetch data and metadata of AC1 342 and C1 341 from the component node data object 320. The system 300 can then fetch relationship data from the component edge data object 330 representing that AC1 342 directly depends on component F1 344 for a function. The F1 344 data in the component node data object 320 can then be retrieved and associated with the AC1 342 component. The same procedure can be done for the CO1 346 component relative to the F1 342 component and for the V1 343 component relative to the C1 component 341. In this manner, an application instance (e.g., a version or snapshot) with relationships as illustrated in the graphical dependency representation 310 can be provided. When requested the instance or version can be assembled of components 340-

346 in a direction of decreasing component dependency (e.g., opposite the direction of increasing dependency indicated by arrow 399).

Figure 4:
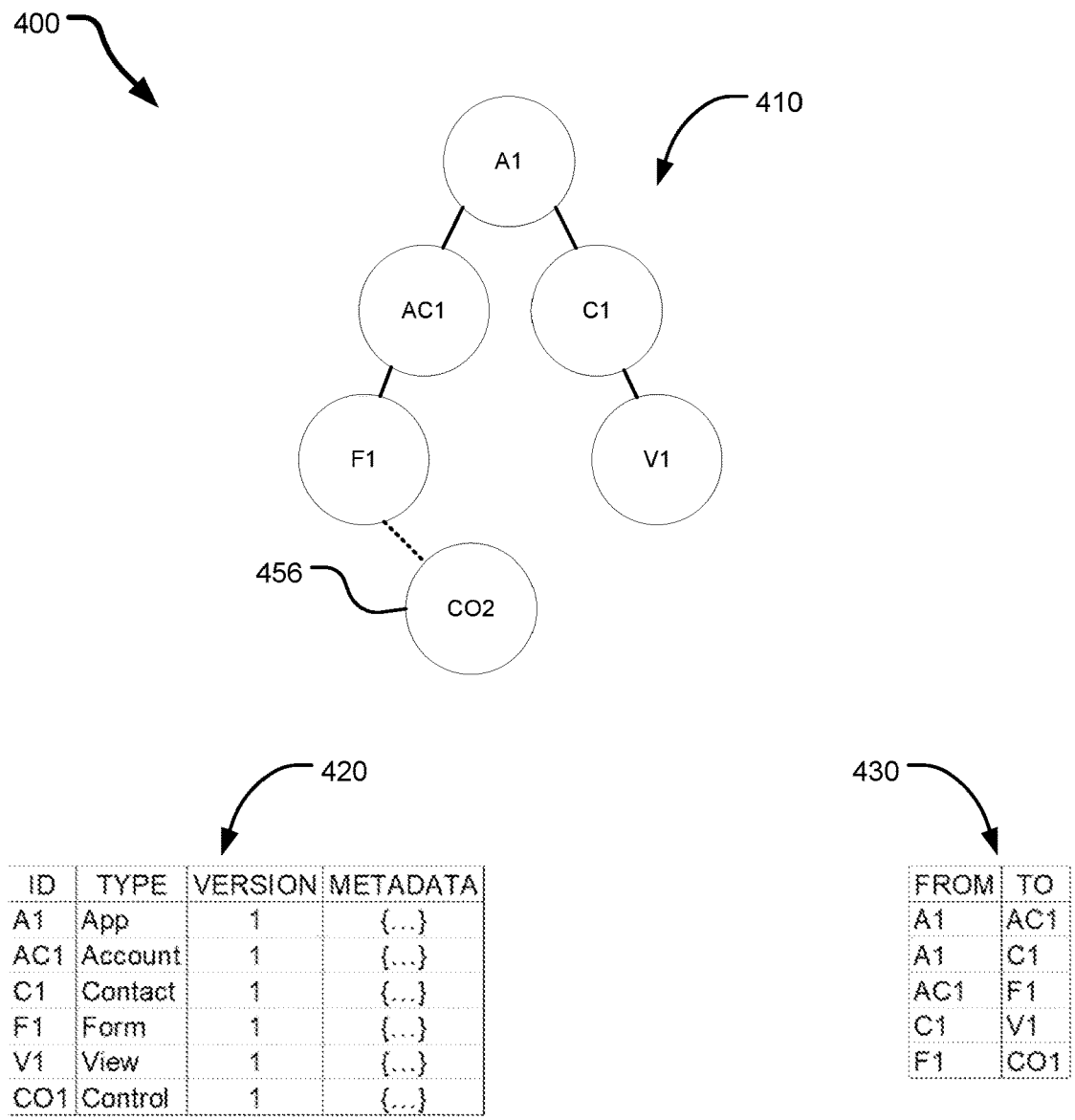
FIG. 4 illustrates an example system for application module version management that has received an update.

A contributor can submit an update to the application or any constituent component. The AppModule versioning system can generate updates to AppModule data, perhaps performing a differencing operation to determine different components (e.g., modified or new components). FIG. 4 illustrates an example system 400 for application module version management that has received an update. The illustrated graphical dependent representation 410 illustrates the dependency relationships of the various components. System 400 illustrates that a differencing operation has identified that a contributor has updated to include a different control component, CO2 456. Despite receiving CO2 456, the component node data object 420 and the component node edge data object 430 have not been modified. This is because the system can first validate CO2 456 to assure that CO2 456 is compatible with elements of the application. The compatibility can be based at least in part on metadata that accompanies the CO2 456.

Figure 5:
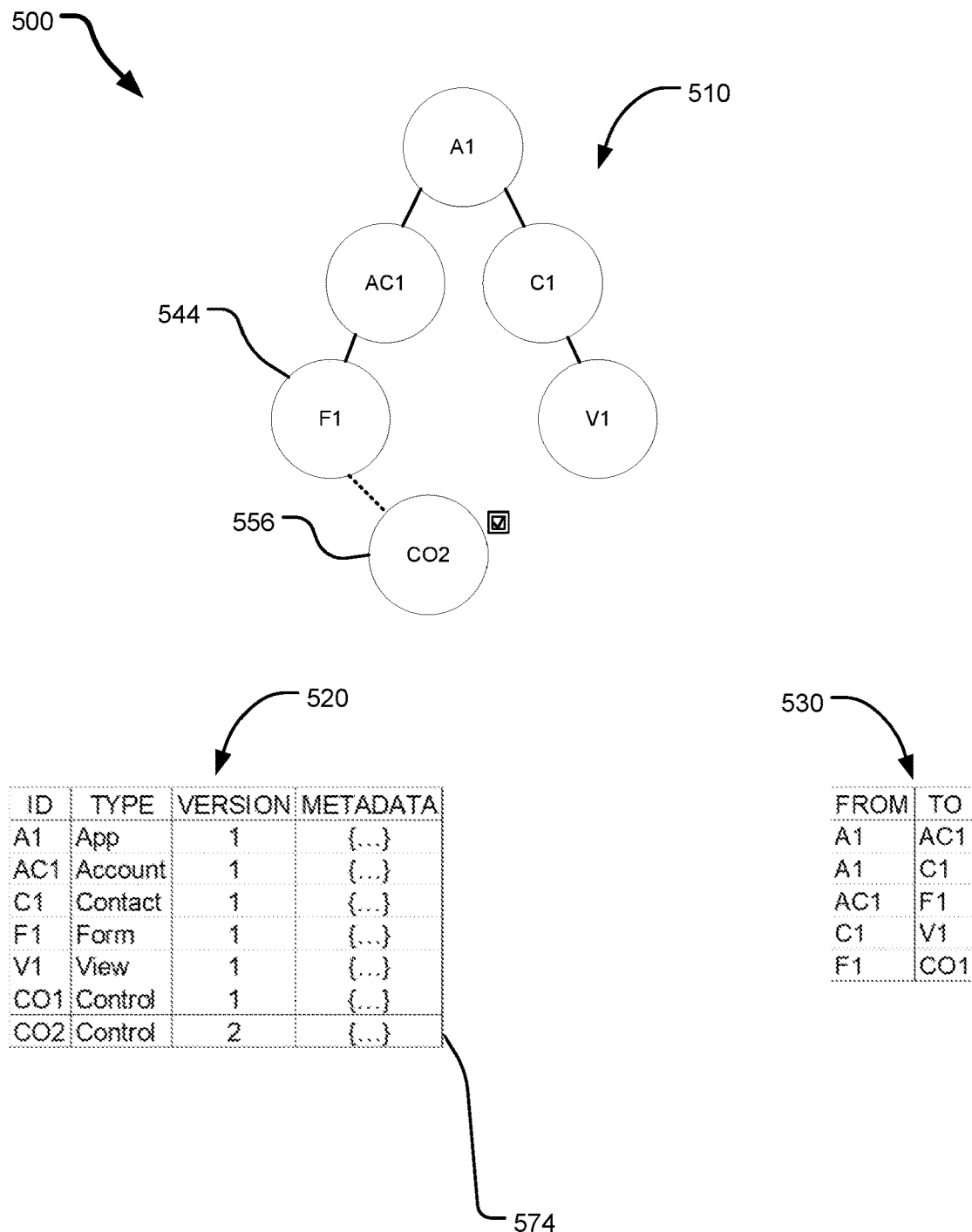
FIG. 5 illustrates an example system for application module version management that has validated a different component.

Validation can be a prerequisite to an inclusion of a different component in an updated version of an application module. For example, FIG. 5 illustrates an example system 500 for application module version management that has validated a different component. Because CO2 556 has been validated, a new entry 574 has been added to the component node data object 520. The entry for CO2 556 has the same type as control CO1 but the version is different. Also, the metadata associated with CO2 556 received in the update is stored in the metadata field and can be different from that of CO1. At this point, as illustrated with a checkmark in a graphical dependency representation 510, component CO2 556 has been validated. The component edge data object 530 has not been illustrated as having been updated. The system can withhold storing any relationship with CO2 556 to validate the component that depends on CO2 556, component F1 544 (or a new version thereof) before a relationship can be established between them.

Figure 6:
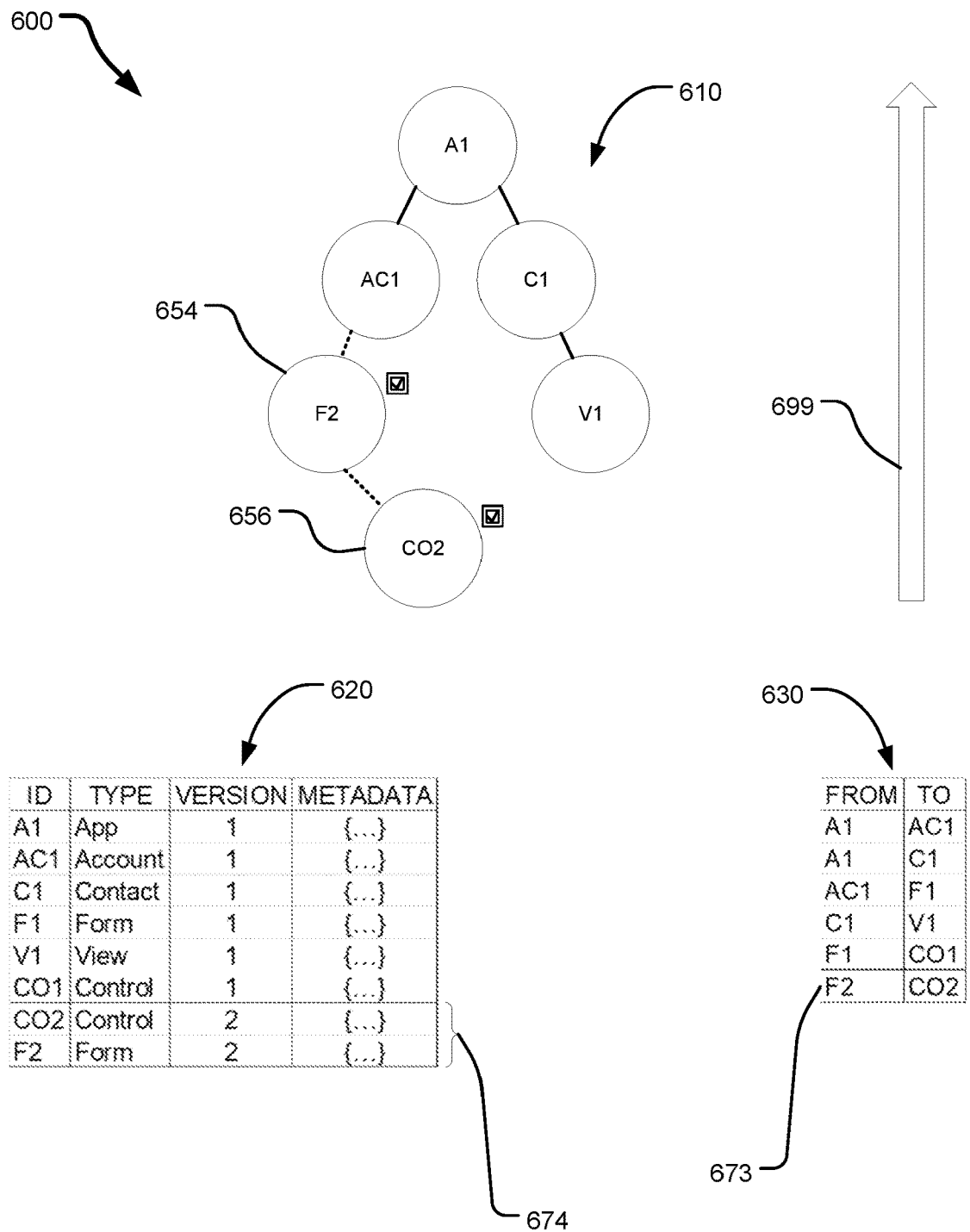
FIG. 6 illustrates an example system for application module version management that has validated a dependent component.

When a different component has been validated, components can also be validated and, perhaps, be given new versions. For example, FIG. 6 illustrates an example system 600 for application module version management that has validated a dependent component. As illustrated by a checkbox in the graphical dependency representation 610, F2 654 has been validated. Because CO2 656 was modified and validated and because F2 654 has also been validated, a new F2 654 entry is added to the component node data object 620. The components specifically associated with the updated version now include the entries 674 for CO2 656 and F2 654. The F2 654 entry includes the same type as F1 but has a different ID, shows that it is version two, and includes metadata specific to the F2 654 component that can be the same or different from the first version CO1 component. Because both elements of the relationship between CO2 656 and F2 654 have been validated, a new relationship entry 673 can be added to the component edge data object 630 to indicate a dependency relationship reflecting that F2 654 depends on CO2 656 for a function of the application.

Figure 7:
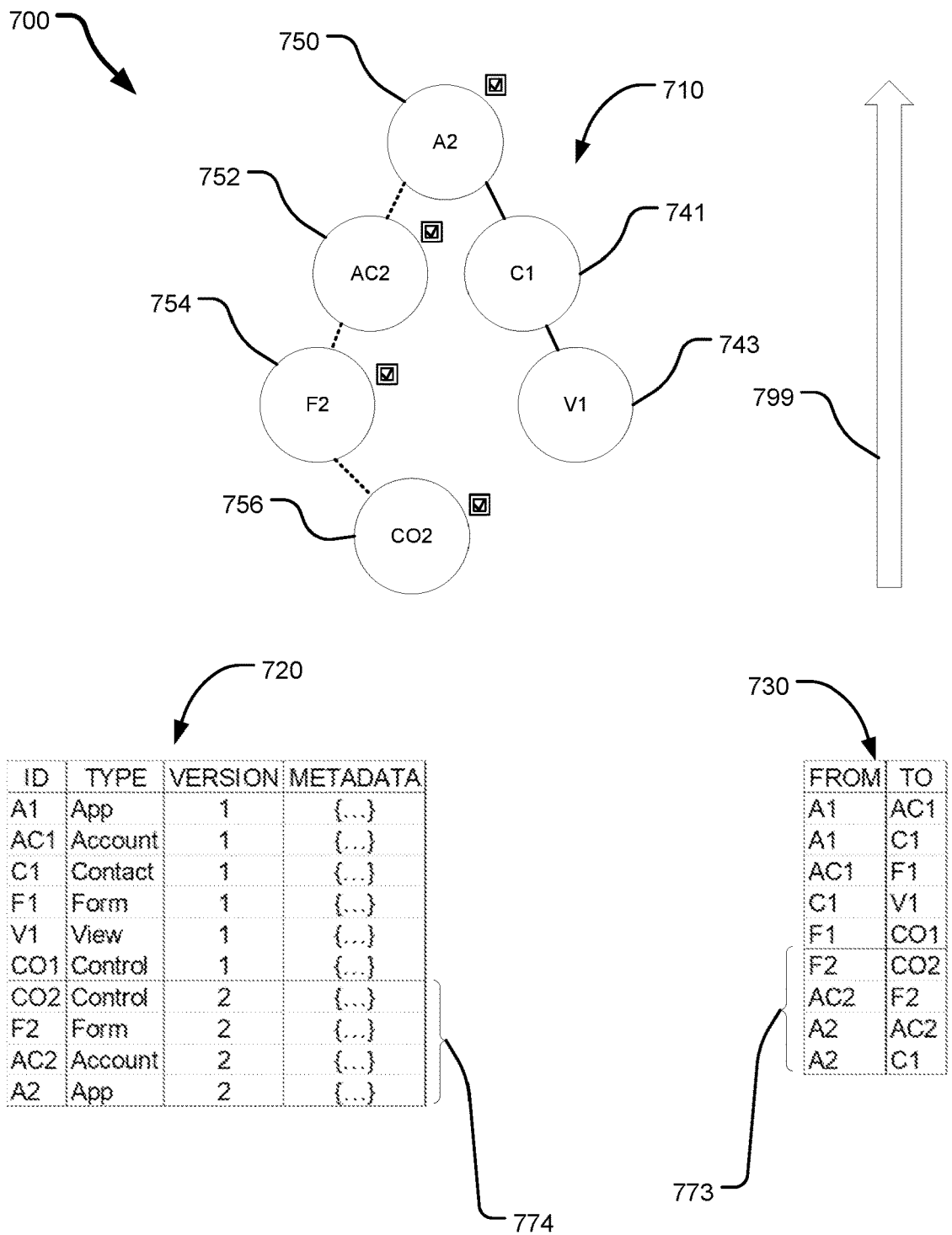
FIG. 7 illustrates an example system for application module version management in which a modified dependency branch has been validated.

This process can continue until all components that depend on the different component CO2 656 are validated and versioned. The validation can be done in an order or direction of increasing dependency as indicated in arrow 699. For example, FIG. 7 illustrates an example system 700 for application module version management in which a modified dependency branch has been validated. As illustrated in the graphical dependency representation 710 using checkboxes, the difference component, CO2 756, and all dependent F2 754, AC2 752, and A2 750 components have been validated. A dependency branch is a line of components that depend on a different component introduced in an update. For example, as illustrated, A2 750 depends on AC2 752, which depends on F2 754, which depends on CO2 756. Because CO2 756 was modified, all of F2 754, AC2 752, A2 750, and CO2 756 are elements of a modified dependency branch. Components C1 741 and V1 743 are elements of an unmodified dependency branch, as none of the components on which they depend for a function of the application has been modified. A2 750 still depends on C1.

As illustrated, the component node data object 720 has entries 774 representing components specific to the update and are all versions two of their prior version components. Each of the version two components 750-756 have accompanying identifiers (e.g., unique or globally unique identifiers), versioning data, and metadata that can be the same as or different from the metadata of the prior version of each component. As can be seen, unmodified branch components, C1 741 and V1 743, do not have different entries in the component edge data object 720.

The component edge data object has entries 773 representing modified relationships for the second version of the application. For example, CO2 756 depends on F2 754, F2 754 depends on AC2 752, and AC2 752 depends on A2 750. The unmodified dependency branch is still incorporated as an element of the application, so the component node data object 720 stores an entry showing A2 750 depends on C1 741. The component edge data object 730 can then use the existing reference between C1 741 and V1 743 to reference the relationship with the V1 component.

Although the graphical dependency representation 710 only represents the second version of the application, the AppModule data as illustrated in the component node data object 720 and the component edge data object 730 has snapshots for both the first version and the second version of the application. For example, to get the first version of the application, the system 700 can request for A1 to be provided with its data. In the component edge data object 730, A1 points to AC1 and C1 741, AC1 points to F1, F1 points to C01, and C1 741 points to V1 743. Data for components A1, AC1, C1 741, F1, C01, and V1 743 are provided in the component node data object 720. In this manner, the component node data object 720 and the component edge data object 730 can be used to assemble the first version of the application.

Similarly, the second version of the application can be assembled. The system 700 can request for A2 to be provided with its data. In the component edge data object 730, A2 points to AC2 752 and C1 741, AC2 752 points to F2 754, F2 754 points to CO2 756, and C1 741 points to V1 743. Data for components A2 750, AC2 752, C1 741, F2 754, CO2 756, and V1 743 are provided in the component node data object 720. In this manner, the component node data object 720 and the component edge data object 730 can be used to assemble the second version of the application. The validation can be done in an order or direction of increasing dependency as indicated in arrow 799

Figure 8:
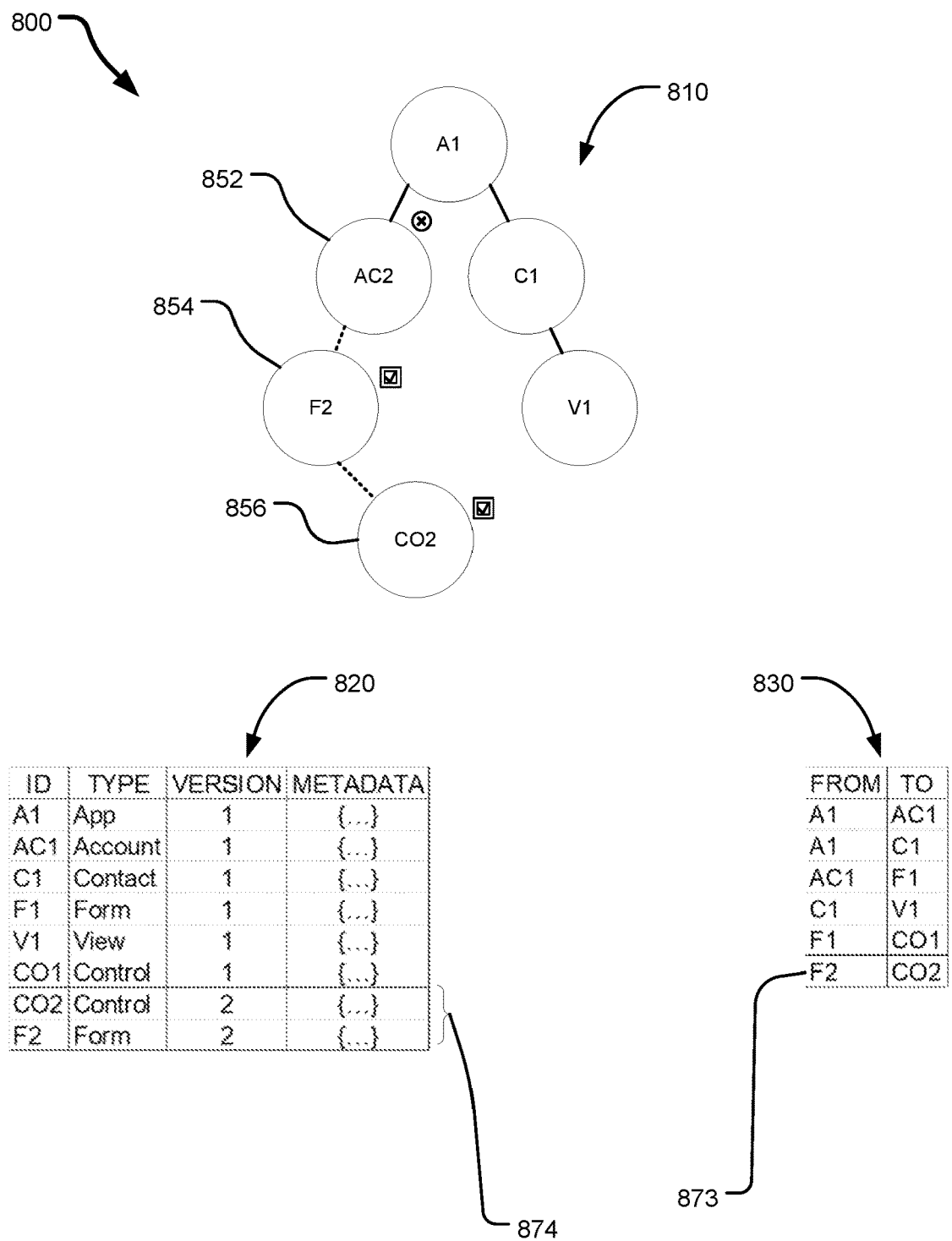
FIG. 8 illustrates an example system for application module version management in which a dependent component does not pass validation.

Implementations are contemplated in which one or more dependent components are not validated. Specifically, FIG. 8 illustrates an example system 800 for application module version management in which a dependent component does not pass validation. As indicated in the graphical dependency representation 810 by checkboxes, the CO2 856 and F2 854 components have been validated. However, component AC2 852 does not pass validation.

In the illustrated implementation, the component node data object 820 includes entries 873 for validated components CO2 856 and F2 854, and the component edge data object 830 has an entry 874 reflecting that F2 854 depends on CO2 856. The system 800 can terminate further validation and storing of AppModule data at this point and indicate to a user and/or contributor that the second version of the application is not functioning with a component of the system 800. In an implementation, the updated entries can be removed at this point or can remain to allow for fixes and resumption of the validation. In this instance, the validation has not extended to the master application component A1 840. As such, there is no second version of the master application component, A2. This can prevent the use of the second version of the application, as the master application component A2 for the second application has no reference in either of the component node data object 820 or the component edge data object 830.

Figure 9:
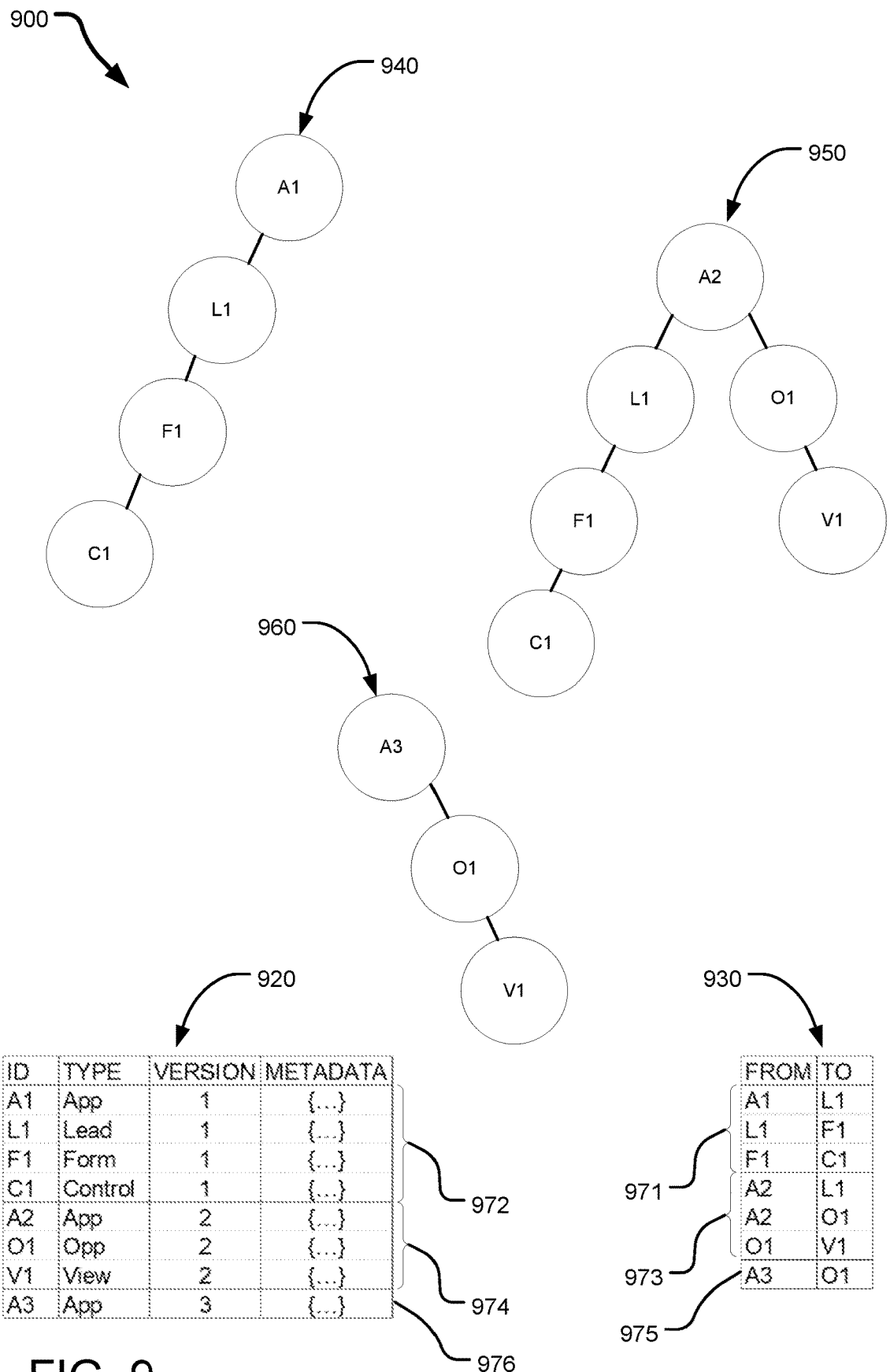
FIG. 9 shows an example system for application version management having representations of three different application versions.

FIG. 9 shows an example system 900 for application version management having representations of three different application versions. A first version graphical dependency representation 940, a second version graphical dependency representation 950, and a third version graphical dependency representation 960 are shown. A component node data object 920 and a component edge data object 930 can combine to provide any of the application instances (e.g., versions or snapshots). Entries 971 and 972 reflect modifications to the AppModule data to provide the first version of the application. Entries 973 and 974 are used in conjunction with any prior relevant entered entries in the AppModule data to provide the second version of the application. Entries 975 and 976 are used in conjunction with any prior relevant entered entries in the AppModule data to provide the third version of the application. Notable in a transition from the third version of the application to the second version of the application, as illustrated in the second and third version graphical dependency representations 950 and 960, a dependency branch with components L1, F1, and C1 has been removed. This can be conveniently achieved by making no reference between the different third version of the master application component, A3 and any of the L1, F1, and C1 components of the branch to be omitted in the third version of the application.

Figure 10:
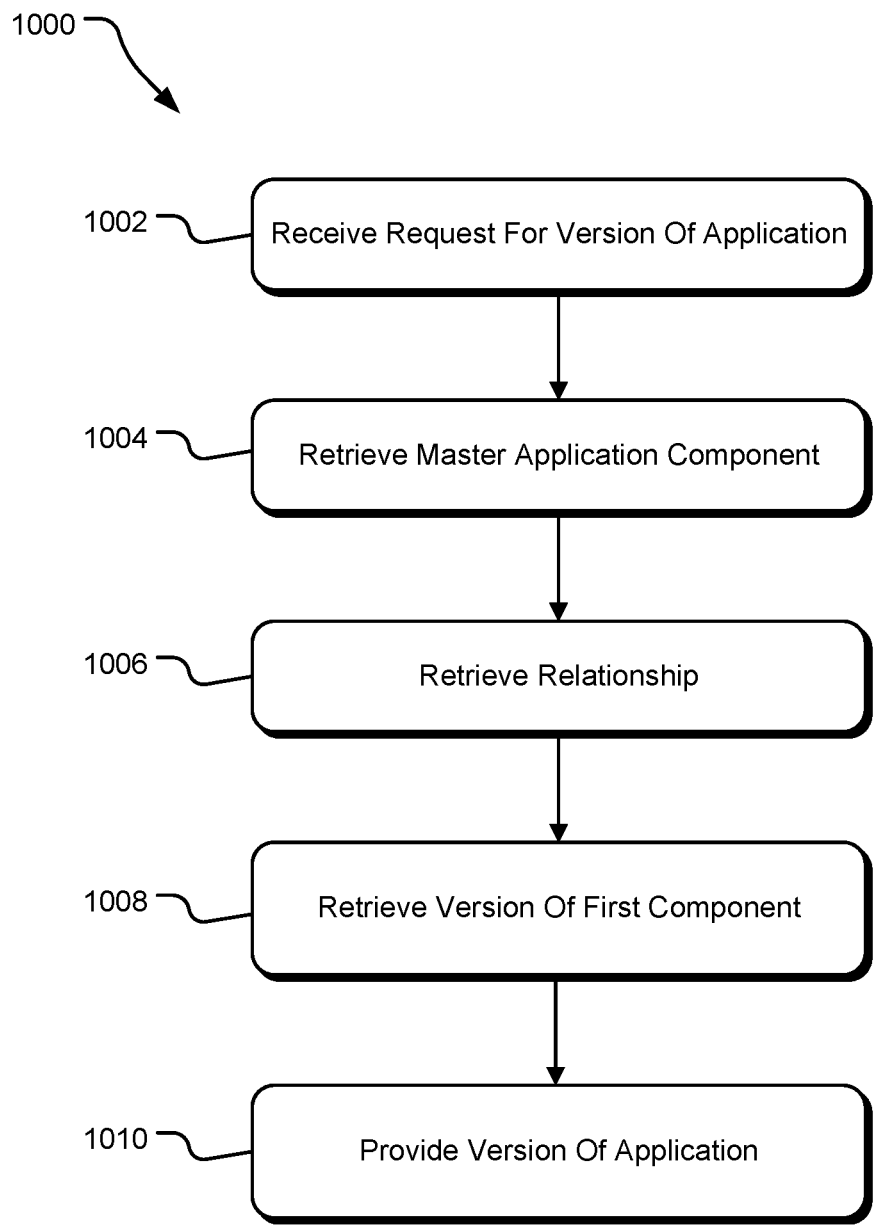
FIG. 10 illustrates example operations for providing a version of an application module.

FIG. 10 illustrates an example operations 1000 for providing a version of an application module. Receiving operation 1002 receives a request for a version of the application. The request can be made by any contributor or requestor including one or more of a producer, an ISV, a maker, a user, and a user administrator. The request can be received by an entity that provides the application or application update (application entity), perhaps a server system of one or more of the contributors or another server for a different third-party service. The request can be for a current, prior, updated or other version of the application module. In implementations, the request can include information regarding a version already stored in a client system in order to allow for a system to provide only the components necessary for an update. In implementations, the client system perhaps includes one or more of an offline device, a user client device that can access the cloud but is controlled by an entity different from the one that assembles the application (providing entity), a client profile in a memory device of the providing entity, a hardware memory space dedicated to the client or a group of clients to which the client belongs, and a hardware and/or software virtual machine dedicated to the client or a group of clients to which the client belongs.

Retrieving operation 1004 retrieves the master application component for the version of the application requested. The master application component for the version of the application requested can have data stored in a component node data object. The component node data object can be any data structure that can relate data. In an implementation, the component node data object has fields including an ID field, TYPE field, VERSION field, and METADATA field. The components can be represented by rows of values for the fields. The ID field can include specific reference to a version of a component, perhaps a unique identifier. The TYPE field can identify the type of component. Examples of types of components include Application (App, perhaps used to identify a master application component, and perhaps a point of initial reference for a version of an application in the component node data object), Account (e.g., a specific user account or accounts for customers), Contact (e.g., a form for storing contact information), Form (e.g., a form having specific fields for data entry), View (e.g., a user interface element), and Control (e.g., a type of controller like a scrollbar). The VERSION field can indicate the version of the component. A new version of a component can get a higher version number. A first version of a component can be version one. In a first version of an application, all components can be version one. The Metadata field can provide metadata for each component, the metadata perhaps including dependency and other data for validating the component as well as other data for assembling and/or executing the application.

Retrieving operation 1004 retrieves relationship data for the master application component from a component node data object. The component edge data object is a data object that relates versions of components. In an implementation, the relationships can be expressed by FROM and TO fields. The relationships in an implementation are expressed from parent components to child components, where the parent components rely on child components for a function of the application. In this implementation, the IDs from the ID field in the component node object data can be used to express the relationships between components as identified in the component edge data object.

In an implementation, the component edge data object can indicate a relationship between the master application component and a version of a first component. With the master component being the most dependent component, the relationship shows that the master component depends on the first component for a function of the application (e.g., that the version of the first component is a child of the version of the master application component). The first component can have several versions with associated data stored in the component node data object, but the relationship between the specific version of the master application component is with a specific version of the first component, as expressed in the component edge data object.

Retrieving operation 1008 retrieves the version of the component upon which the version of the master application component. The retrieving operation 1008 includes retrieving data associated with the version of the first component from the component node data object. For example, the version of the first component can have associated versioned metadata stored in the component node data object, and that associated versioned metadata can be used to provide the application.

Retrieving operations 1006 and 1008 can be repeated for further components upon which the master application component depends and can also be conducted for relationships between sub-components of the first components and further progeny components until all of the components of the application are available. This progressive component node and edge data assembly can be done in a direction of decreasing component dependency.

Providing operation 1010 assembles the application and provides for execution of the application for the requestor. The assembling is conducted based on the nodes in the component node data object and the relationships stored in the component edge data object. Once assembled, the application or application update can be provided as an executable file, as a difference data object that provides data needed to update an existing version of the application, or the application might not be a discrete application but an assembly of instances of components that operate based at least in part on the data stored in the component node data object and the component edge data object. In implementations with a difference data object, a difference generator can be used to generate the difference data object.

In an implementation in which the application is stored on a client memory device other than a memory device of the providing entity, for instance, an off-site and/or offline computing device, the client memory device might have a version of the application or might not yet have the application. In implementations in which the client device already has a version of the application, the request can be for an update to a new version of the application or to reverse an update to go to a prior version of the application. In this implementation, the providing entity can provide a full version of the requested application or can provide data representing a difference between the currently installed version and the requested version of the application. In an implementation where the difference is provided, the request can have initially included data regarding the version that was already installed in the client device.

In a network-based implementation, the application instances are stored in a networked memory device and accessible by a client over the cloud. The storage can be controlled by the providing entity or a different entity, either of which can be associated with or controlled by one of the contributors. In this implementation, the applications can be stored in general storage of the storing entity or can be in specific memory and/or software space for the application and/or the client. In the network-based implementation, the program instances or versions can be saved as executable functions. In an alternative implementation, the AppModule data can include references to instances of compiled and associated components such that no specific instances of executables or program modules are compiled to form a separate program instance. In this implementation, the networked memory device merely communicates data between instances of components without assembling the instances of versions of the applications.

Figure 11:
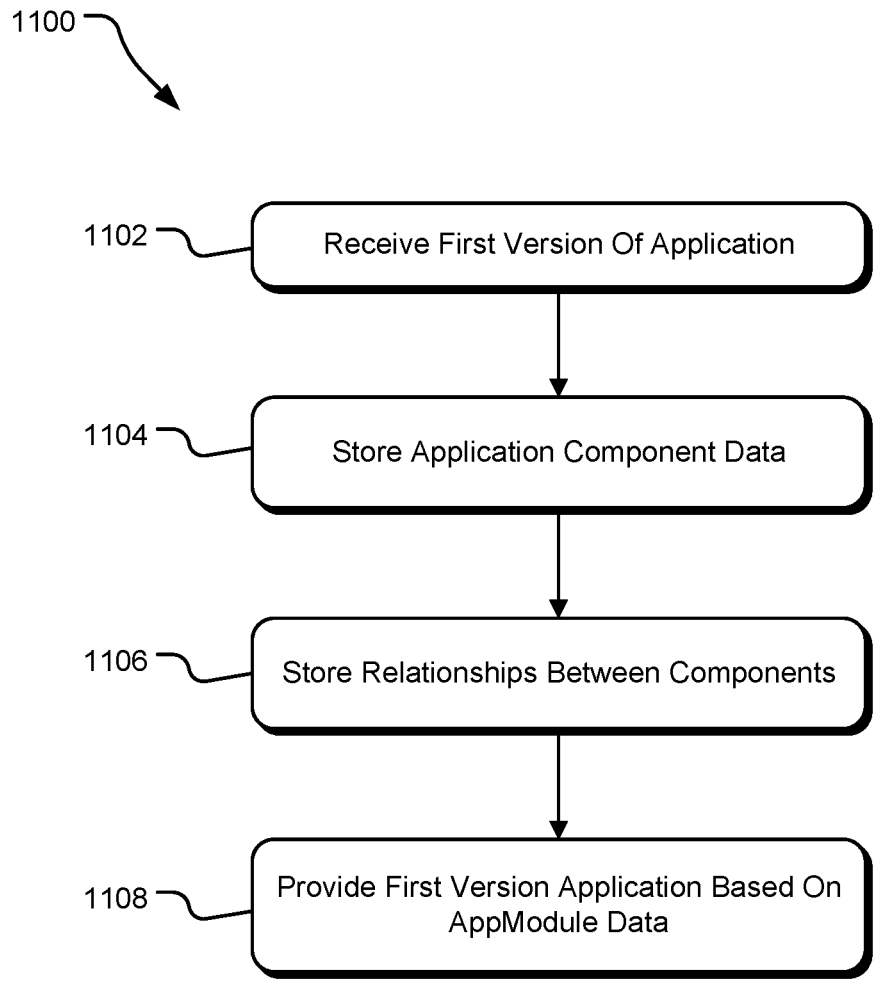
FIG. 11 illustrates example operations for generating a first version of an application.

FIG. 11 illustrates an example operations 1100 for generating a first version of an application. Receiving operation 1102 receives a first version of the application from a contributor. The first version of the application may be assembled of components with associated metadata. In an implementation, the received first version may store relationships for child components in parent components before being processed according to the presently disclosed technology.

Storing operation 1104 stores application component data in a component node data object. The component node data object can include information for each component. For example, the component node data object can store one or more of a component ID (e.g., a unique or globally unique component ID), a component type (e.g., master App type, account, contact, form, view, and control), a component version (which can be one for all components in the first version of an application, but the application can use existing components from different sources), and component metadata. The component metadata can include information for how to execute the component and can also include dependency data used to validate the component's compatibility with other components in the application. Storing operation 1104 can provide a considerable amount of precached data to expedite assembly of the application.

Storing operation 1106 stores data representing relationships between versions of components in a component edge data object. The relationships between the components received in receiving operation 1102 and stored in storing operation 1104 can be connected in a dependency hierarchy by the relationship data stored in the component edge data object.

Providing operation 1108 provides for execution of the first version of the application based at least in part on the component node data object and the component edge data object. Because the component node data object has data for building and validating the components and the component edge data object has the relationship data relating the components, the component node data object and the component edge data object can have representations of any version, instance, or snapshot of any version of the application. In this implementation, the first version is provided to the requestor. The providing operation 1108 can provide the resulting application as a standalone application or as an update of an existing application (e.g., a version of a complete application, a version of an application module, a diff generated with the difference between a presently installed version and a different version of the application, assembled or marshaled instances of components related using the AppModule data). The application can be provided on a memory device, for example, on a provider server or delivered to a client device.

Figure 12:
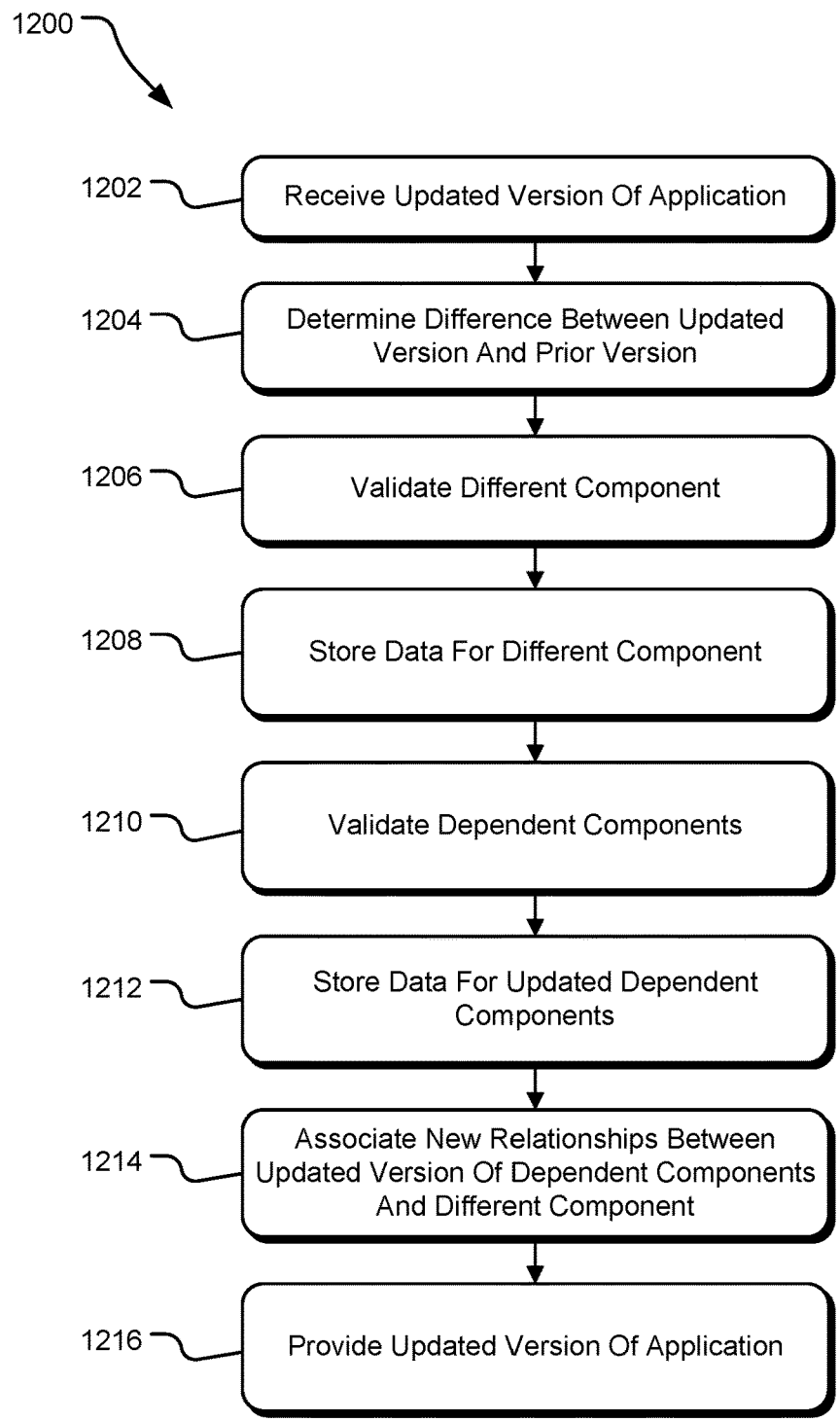
FIG. 12 illustrates example operations for providing an updated version of an application.

FIG. 12 illustrates an example operations 1200 for providing an updated version of an application. Receiving operation 1202 receives an updated version of an application from a contributor. The updated version can include an entire application package or can be an application module for use in building an application.

Determining operation 1204 determines a difference between an existing version of the application and the updated version received by receiving operation 1202. The contributor can have added or subtracted components relative to an existing application version or can have modified versions of existing components. The update can include existing components and different components. The existing components that do not depend on different or modified components can be elements of the unmodified dependency branches. The different components and components that depend on the different components can be elements of a modified dependency branch.

Validating operation 1206 validates at least one different component (e.g., updated version of an existing component or a new component) that is different from components in the existing version. The validating operation 1206 can check compatibility, perhaps based at least in part on compatibility. The compatibility can be determined based at least in part on metadata associated with the different component that can include dependency data. Validation can be a precursor to inclusion of a different component in an updated version of an application module.

Storing operation 1208 stores data for the different component. The storing operation 1208 stores one or more of an identifier of, a component type of, a version of, and metadata associated with the different component in the component node data object. The stored metadata can include dependency data used to validate the different component and/or ensure compatibility with other components in the application.

Validating operation 1210 validates at least one dependent component that depends on the different component to function. The at least one dependent component can include a master application component. The master application component can represent a version of the updated version of the application. The validating operation 1210 can be conducted for all dependent components in a same modified dependency branch as the different component. The validating operation 1210 can be conducted in an order of dependent components of increasing dependence.

If either or both of the validating operations 1206 and/or 1208 fail for a different component or a dependent component, the version might not be fully implemented in the AppModule data. For example, entries might not be fully stored for a dependency branch in one or more of the component node data object and the component edge data object. If the validation does not progress to a new version of the master application node, the new version of the master application might not be available to use to reference the updated version of the application, perhaps keeping the prior version of the application as a default option until the issues preventing validation are resolved.

Storing operation 1212 stores data for updated dependent components in the component node data object. Dependent components can be given new versioned entries in the component node data object upon validation. These new versions of the components can each have new entries in the component node data object for one or more of component identifier, component type, component version, and component version metadata. The component version metadata can include data used to validate the components. A new versioned entry for the master application component can be used to reference the updated version of the application.

Associating operation 1214 associates the dependent components and the different component in a component edge data object. The component edge data object relates dependencies between components with direct dependency relationships. For example, a parent component that directly depends on a child component for a function of the application is associated with the child component in the component edge data object. In an implementation, the component edge data object can include "From" and "To" fields to show the relationship, perhaps with the parent component entered in the "From" field.

In implementations, components of unmodified dependency branches can not have updated entries in the component node data object. If the components of the unmodified dependency branches are to remain in the updated version of the application, associating operation 1214 can add an entry representing relationships between one or more of the components of the modified dependency branch and one or more of the components of the unmodified dependency branch in the component edge data object. If a branch is to be omitted in an updated version, the most dependent component of the branch might have no association stored with any component that depends on a modified component in the component edge data object.

AppModule data in the component node data object and the component edge data object provide snapshots (e.g., records or instances) of both the first version of the application and the second version of the application. From this AppModule data, these versions and any similar version can be provided and/or recreated upon request.

Providing operation 1216 provides for execution of the updated version of the application based at least in part on the component node data object and the component edge data object. Because the component node data object has data for building and validating the components and the component edge data object has the relationship data relating the components, the component node data object and the component edge data object can have representations of any version, instance, or snapshot of any version of the application. In this implementation, the updated version of the application is provided to the requestor. The providing operation 1216 can provide the resulting application as a standalone application or as an update of an existing application (e.g., a version of a complete application, a version of an application module, a diff generated with the difference between a presently installed version and a different version of the application, assembled or marshaled instances of components related using the AppModule data). The application can be provided on a memory device, for example, on a provider server or delivered to a client device.

Figure 13:
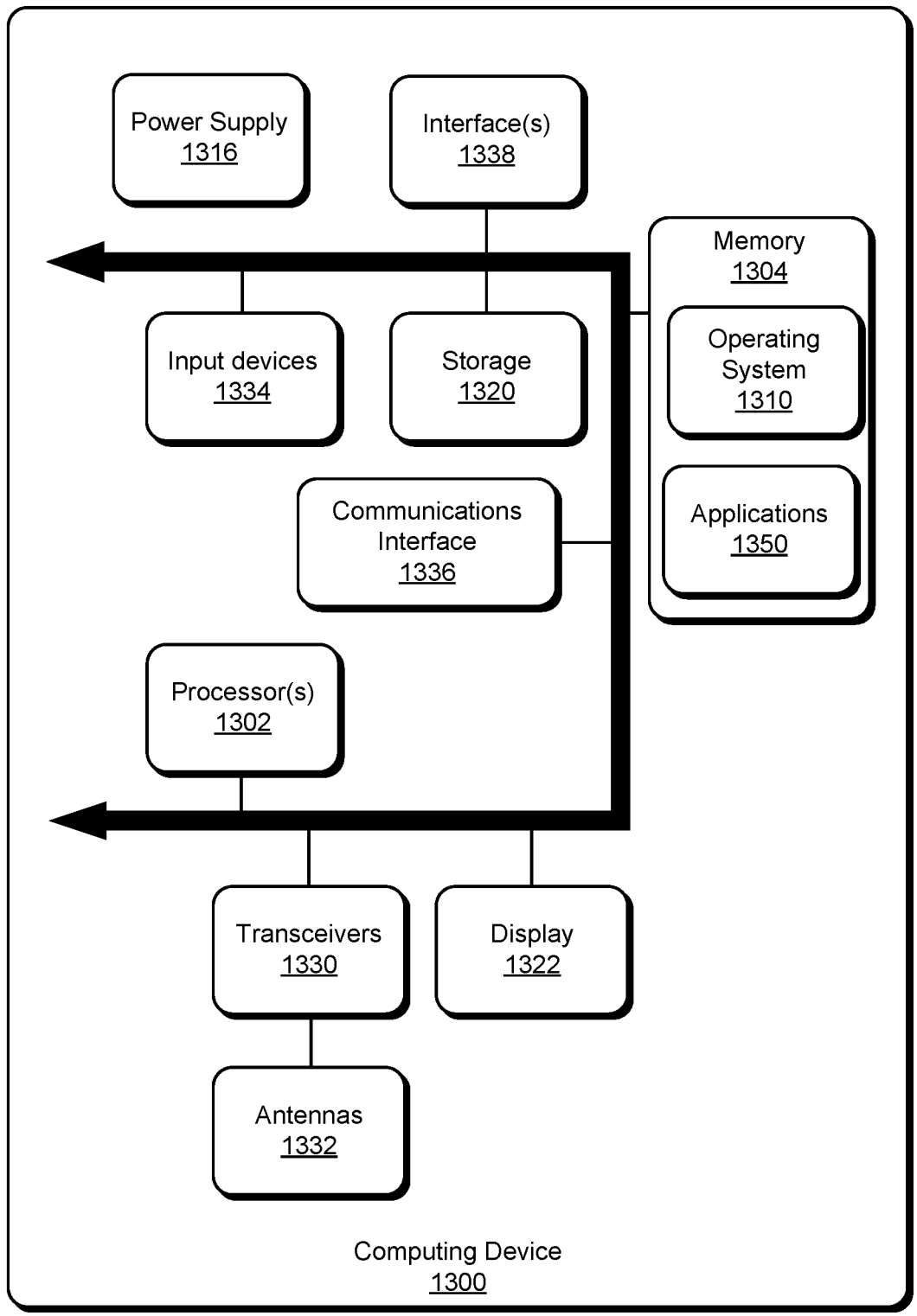
FIG. 13 illustrates an example computing device for implementing the features and operations of the described technology.

FIG. 13 illustrates an example computing device 1300 for implementing the features and operations of the described technology. The computing device 1300 can embody a remote-control device or a physical controlled device and is an example network-connected and/or network-capable device and can be a client device, such as a laptop, mobile device, desktop, tablet; a server/cloud device; an internet-of-things device; an electronic accessory; or another electronic device. The computing device 1300 includes one or more processor(s) 1302 and a memory 1304. The memory 1304 generally includes both volatile memory (e.g., RAM) and nonvolatile memory (e.g., flash memory). An operating system 1310 resides in the memory 1304 and is executed by the processor(s) 1302.

In an example computing device 1300, as shown in FIG. 13, one or more modules or segments, such as applications 1350, updaters, fetchers, retrievers, receivers, data storers, compilers, executors, application modules, fetchers, assemblers, marshalers, transmitters, determiners, associated metadata storers, relationship storers, version of master application component retrievers, a relationship retrievers, a corresponding version of first component retrievers, execution providers, master application component retrievers, difference generators, validators, requestors, are loaded into the operating system 1310 on the memory 1304 and/or storage 1320 and executed by processor(s) 1302. The storage 1320 can include one or more tangible storage media devices and can store component node data objects, component edge data objects, AppModule data, application snapshots, application instances, application versions, relationships, associations, dependencies, dependency relationships, dependency chains, dependency branches, modified dependency branches, unmodified dependency branches, application components, application component versions, master application components, different components, dependent components, component metadata, sub-components, child component, parent component, component genealogy, parent components, ancestor components, versioning data, component type data, component version data, component identifiers, data regarding existing versions of applications on a client, difference data objects, graphical dependency representations, locally and globally unique identifiers, requests, responses, and other data and be local to the computing device 1300 or can be remote and communicatively connected to the computing device 1300.

The computing device 1300 includes a power supply 1316, which is powered by one or more batteries or other power sources and which provides power to other components of the computing device 1300. The power supply 1316 can also be connected to an external power source that overrides or recharges the built-in batteries or other power sources.

The computing device 1300 can include one or more communication transceivers 1330, which can be connected to one or more antenna(s) 1332 to provide network connectivity (e.g., mobile phone network, Wi-Fi®, Bluetooth®) to one or more other servers and/or client devices (e.g., mobile devices, desktop computers, or laptop computers). The computing device 1300 can further include a network adapter 1336, which is a type of computing device. The computing device 1300 can use the adapter and any other types of computing devices for establishing connections over a wide-area network (WAN) or local-area network (LAN). It should be appreciated that the network connections shown are examples and that other computing devices and means for establishing a communications link between the computing device 1300 and other devices can be used.

The computing device 1300 can include one or more input devices 1334 such that a user can enter commands and information (e.g., a keyboard or mouse). These and other input devices can be coupled to the server by one or more interfaces 1338, such as a serial port interface, parallel port, or universal serial bus (USB). The computing device 1300 can further include a display 1322, such as a touch screen display.

The computing device 1300 can include a variety of tangible processor-readable storage media and intangible processor-readable communication signals. Tangible processor-readable storage can be embodied by any available media that can be accessed by the computing device 1300 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1300. In contrast to tangible processor-readable storage media, intangible processor-readable communication signals can embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which can include logic machines configured to execute hardware or firmware instructions. For example, the processors can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

Aspects of processors and storage can be integrated together into one or more hardware logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of a remote-control device and/or a physically controlled device implemented to perform a particular function. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service," as used herein, is an application program executable across one or multiple user sessions. A service can be available to one or more system components, programs, and/or other services. In some implementations, a service can run on one or more server computing devices.

The logical operations making up embodiments of the invention described herein can be referred to variously as operations, steps, objects, or modules. Furthermore, it should be understood that logical operations can be performed in any order, adding or omitting operations as desired, regardless of whether operations are labeled or identified as optional, unless explicitly claimed otherwise or a specific order is inherently necessitated by the claim language.

An example method of managing versions of an application is disclosed. The method includes receiving a request for a version of an application, retrieving, responsive to the received request, a version of a master application component based at least in part on version data that associates a version of the master application component with the version of the application, retrieving a relationship operable to relate the version of the master application component with a corresponding version of a first component on which the master application component depends for a function of the application, retrieving the corresponding version of the first component, responsive to the retrieving of the relationship, assembling the version of the application based at least in part on the retrieved version of the master application component, the retrieved relationship, and the retrieved corresponding version of the first component, and providing for an execution of the assembled version of the application, wherein the version of the master application component is one of a plurality of versions of the master application component and the corresponding version of the first component is one of a plurality of versions of the first component.

Another example method of any preceding method is provided, wherein one or more of the operations of retrieving the version of the master application component and of retrieving the corresponding version of the first component includes retrieving data associated with one or more of the retrieved version of the master application component and the retrieved corresponding version of the first component, wherein the data retrieved includes data representing one or more of a component identifier, a component type, a component version, and component associated metadata.

Another example method of any preceding method is provided, the method further including receiving a different version of the application, determining a difference between the different version of the application and the version of the application, wherein the difference includes a different version of the first component, the different version of the first component including associated metadata, validating that the different version of the first component functions with the application based on the associated metadata, storing, responsive to the validating, the associated metadata with a reference to the different version of the first component and a corresponding reference to a different version of the master application component, storing, responsive to the validating, a second relationship, wherein the second relationship is operable to relate the different version of the first component with the corresponding different version of the master application component, assembling the different version of the application based at least in part on the different version of the first component, the corresponding different version of the master application component, and the second relationship, and providing for the execution of the different version of the application.

Another example method of any preceding method is provided, the method further including receiving a request from a computing device for the different version of the application, including data representing that the version of the application is stored in a memory of the computing device and transmitting a data update that includes a difference between the version and the different version of the application to the computing device, wherein the data update includes less than an entirety of the different version of the application.

Another example method of any preceding method is provided, wherein validating of components is conducted in a direction of increasing dependency along a modified dependency branch of components.

Another example method of any preceding method is provided, wherein the different version of the application includes components of an unmodified dependency branch of the version of the application, the assembling the different version of the application further based on the components of the unmodified dependency branch.

Another example method of any preceding method is provided, the method further including storing, responsive to the storing of the second relationship, a third relationship, wherein the third relationship is operable to relate a component of a modified dependency branch to at least one of the components of the unmodified dependency branch.

An example computing device having a processor and a memory, the processor configured to execute instructions stored in the memory is disclosed. The computing device includes a receiver executable by the processor to receive a request for a version of an application, a version of master application component retriever executable by the process to retrieve, responsive to the receipt of the request, a version of a master application component based at least in part on version data that associates a version of the master application component with the version of the application a relationship retriever executable by the processor to retrieve a relationship operable to relate the version of the master application component with a corresponding version of a first component on which the master application component depends for a function of the application, a corresponding version of first component retriever executable by the processor to retrieve the corresponding version of the first component, responsive to the retrieval of the relationship, an assembler executable by the processor to assemble the version of the application based at least in part on the retrieved version of the master application component, the retrieved relationship, and the retrieved corresponding version of the first component, and an execution provider executable by the process to provide for an execution of the assembled version of the application, wherein the retrieved version of the master application component is one of a plurality of versions of the master application component and the corresponding retrieved version of the first component is one of a plurality of versions of the first component.

Another example computing device of any preceding device, wherein one or more of the version of master application component retriever and the corresponding version of first component retriever are configured to retrieve data associated with one or more of the retrieved version of the master application component and the retrieved corresponding version of the first component, wherein the data retrieved includes data representing one or more of a component identifier, a component type, a component version, and component associated metadata.

Another example computing device of any preceding device, wherein the receiver is further configured to receive a different version of the application, the computing device further comprising a determiner executable by the processor to determine a difference between the different version of the application and the version of the application, wherein the difference includes a different version of the first component, the different version of the first component including associated metadata, a validator executable by the processor to validate that the different version of the first component functions with the application based on the associated metadata, an associated metadata storer executable by the processor to store, responsive to the validation, the associated metadata with a reference to the different version of the first component and a corresponding reference to a different version of the master application component, a relationship storer executable by the processor to store, responsive to the validation, a second relationship, wherein the second relationship is operable to relate the different version of the first component with the corresponding different version of the master application component, wherein the assembler is further configured to assemble the different version of the application based at least in part on the different version of the first component, the corresponding different version of the master application component, and the second relationship, and wherein the provider is further configured to provide for the execution of the different version of the application.

Another example computing device of any preceding device, wherein the receiver is further configured to receive a request from a computing device for the different version of the application, including data representing that the version of the application is stored in a memory of the computing device, the computing device further comprising a transmitter to transmit a data update that includes a difference between the version and the different version of the application to the computing device, wherein the data update includes less than an entirety of the different version of the application.

Another example computing device of any preceding device, wherein the validation is conducted in a direction of increasing dependency along a modified dependency branch of components.

Another example computing device of any preceding device, wherein the different version of the application includes components of an unmodified dependency branch of the version of the application, the assembler configured to assemble the different version of the application further based on the components of the unmodified dependency branch.

Another example computing device of any preceding device, wherein the relationship storer is further configured to store, responsive to the storage of the second relationship, a third relationship, wherein the third relationship is operable to relate a component of a modified dependency branch to at least one of the components of the unmodified dependency branch.

One or more example tangible processor-readable storage media embodied with instructions for executing on one or more processors and circuits of a communication device a process for managing versions of an application is provided. The process includes receiving a request for a version of an application, retrieving, responsive to the received request, a version of a master application component based at least in part on version data that associates a version of the master application component with the version of the application, retrieving a relationship operable to relate the version of the master application component with a corresponding version of a first component on which the master application component depends for a function of the application, retrieving the corresponding version of the first component, responsive to the retrieval of the relationship, assembling the version of the application based at least in part on the retrieved version of the master application component, the retrieved relationship, and the corresponding version of the retrieved first component, and providing for an execution of the assembled version of the application, wherein the retrieved version of the master application component is one of a plurality of versions of the master application component and the corresponding retrieved version of the first component is one of a plurality of versions of the first component.

One or more other example tangible processor-readable storage media of any preceding media is provided, wherein one or more of the operations of retrieving the version of the master application component and of retrieving the corresponding version of the first component, comprise retrieving data associated with one or more of the retrieved version of the master application component and the retrieved corresponding version of the first component, wherein the data retrieved includes data representing one or more of a component identifier, a component type, a component version, and component associated metadata.

One or more other example tangible processor-readable storage media of any preceding media is provided, the process further comprising receiving a different version of the application, determining a difference between the different version of the application and the version of the application, wherein the difference includes a different version of the first component, the different version of the first component including associated metadata, validating that the different version of the first component functions with the application based on the associated metadata, storing, responsive to the validating, the associated metadata with a reference to the different version of the first component and a corresponding reference to a different version of the master application component, storing, responsive to the validating, a second relationship, wherein the second relationship is operable to relate the different version of the first component with the corresponding different version of the master application component, assembling the different version of the application based at least in part on the different version of the first component, the corresponding different version of the master application component, and the second relationship, and providing for the execution of the different version of the application.

One or more other example tangible processor-readable storage media of any preceding media is provided, the process further comprising receiving a request from a computing device for the different version of the application, including data representing that the version of the application is stored in a memory of the computing device and transmitting a data update that includes a difference between the version and the different version of the application to the computing device, wherein the data update includes less than an entirety of the different version of the application.

One or more other example tangible processor-readable storage media of any preceding media is provided, wherein validating of components is conducted in a direction of increasing dependency along a modified dependency branch of components.

One or more other example tangible processor-readable storage media of any preceding media is provided, wherein the different version of the application includes components of an unmodified dependency branch of the version of the application, the assembling the different version of the application further based on the components of the unmodified dependency branch, the process further comprising storing, responsive to the storing of the second relationship, a third relationship, wherein the third relationship is operable to relate a component of a modified dependency branch to at least one of the components of the unmodified dependency branch.

An example system of managing versions of an application is disclosed. The system includes means for receiving a request for a version of an application, means for retrieving, responsive to the received request, a version of a master application component based at least in part on version data that associates a version of the master application component with the version of the application, means for retrieving a relationship operable to relate the version of the master application component with a corresponding version of a first component on which the master application component depends for a function of the application, means for retrieving the corresponding version of the first component, responsive to the retrieving of the relationship, means for assembling the version of the application based at least in part on the retrieved version of the master application component, the retrieved relationship, and the retrieved corresponding version of the first component, and means for providing for an execution of the assembled version of the application, wherein the version of the master application component is one of a plurality of versions of the master application component and the corresponding version of the first component is one of a plurality of versions of the first component.

Another example system of any preceding system is provided, wherein one or more of the retrieval of the version of the master application component and the retrieval of the corresponding version of the first component includes retrieval of data associated with one or more of the retrieved version of the master application component and the retrieved corresponding version of the first component, wherein the data retrieved includes data representing one or more of a component identifier, a component type, a component version, and component associated metadata.

Another example system of any preceding system is provided, the system further including means for receiving a different version of the application, means for determining a difference between the different version of the application and the version of the application, wherein the difference includes a different version of the first component, the different version of the first component including associated metadata, means for validating that the different version of the first component functions with the application based on the associated metadata, means for storing, responsive to the validation, the associated metadata with a reference to the different version of the first component and a corresponding reference to a different version of the master application component, means for storing, responsive to the validation, a second relationship, wherein the second relationship is operable to relate the different version of the first component with the corresponding different version of the master application component, means for assembling the different version of the application based at least in part on the different version of the first component, the corresponding different version of the master application component, and the second relationship, and means for providing for the execution of the different version of the application.

Another example system of any preceding system is provided, the system further including means for receiving a request from a computing device for the different version of the application, means for including data representing that the version of the application is stored in a memory of the computing device and means for transmitting a data update that includes a difference between the version and the different version of the application to the computing device, wherein the data update includes less than an entirety of the different version of the application.

Another example system of any preceding system is provided, wherein validation of components is conducted in a direction of increasing dependency along a modified dependency branch of components.

Another example system of any preceding system is provided, wherein the different version of the application includes components of an unmodified dependency branch of the version of the application, the assembly of the different version of the application further based on the components of the unmodified dependency branch.

Another example system of any preceding system is provided, the system further including means for storing, responsive to the storing of the second relationship, a third relationship, wherein the third relationship is operable to relate a component of a modified dependency branch to at least one of the components of the unmodified dependency branch.

While this specification contains many specific implementation details, these should not be construed as limitations on the scope of any inventions or of what can be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

A number of implementations of the described technology have been described. Nevertheless, it will be understood that various modifications can be made without departing from the spirit and scope of the recited claims.

What is claimed is:

1. A method of managing versions of an application, comprising:
    assembling a first version of the application based on a first version of a master application component, a relationship operable to relate the first version of the master application component with a corresponding version of a first component on which the master application component depends for a function of the application, and the corresponding version of the first component;
    validating, using a graphical representation of the application, that a different version of the first component functions with the application based on metadata associated with the different version of the first component;
    determining a difference between a different version of the application and the first version of the application, wherein the difference includes the different version of the first component, the different version of the first component including metadata associated with the different version of the first component;
    storing, the metadata associated with the different version of the first component with a reference to the different version of the first component and a corresponding reference to the different version of the master application component;
    storing, a second relationship, wherein the second relationship is operable to relate the different version of the first component with the different version of the master application component; and
    assembling, based on the second relationship, a different version of the application based on a different version of the master application component and the different version of the first component.

2. The method of claim 1, further comprising:
    retrieving the first version of the master application component based on version data that associates the first version of the master application component with the first version of the application.

3. The method of claim 1, further comprising:
retrieving data associated with one or both of the first version of the master application component and the corresponding version of the first component, wherein the data retrieved includes data representing one or more of a component identifier, a component type, a component version, and component associated metadata.

4. The method of claim 1, further comprising:
transmitting a data update that includes a difference between the first version of the application and the different version of the application to a computing device, wherein the data update includes less than an entirety of the different version of the application.

5. The method of claim 1, wherein validating of components is conducted along a modified dependency branch of components.

6. The method of claim 1, wherein the different version of the application includes components of an unmodified dependency branch of the first version of the application, and assembling the different version of the application further is based on the components of the unmodified dependency branch.

7. A computing device having a processor and a memory, the processor configured to execute instructions stored in the memory, the computing device comprising:
an assembler stored in the memory and configured to assemble a first version of an application based on a first version of a master application component, a relationship operable to relate the first version of the master application component with a corresponding version of a first component on which the master application component depends for a function of the application, and the corresponding version of the first component;
a determiner stored in the memory and configured to determine a difference between the different version of the application and the first version of the application, wherein the difference includes the different version of the first component, the different version of the first component including metadata associated with the different version of the first component;
an associated data storer stored in the memory and configured to store the metadata associated with the different version of the first component with a reference to the different version of the first component and a corresponding reference to the different version of the master application component and to store a second relationship, wherein the second relationship is operable to relate the different version of the first component with the different version of the master application component, wherein assembling the different version of the application is further based on the second relationship; and
a validator stored in the memory and configured to validate, using a graphical representation of the application, that a different version of the first component functions with the application based on metadata associated with the different version of the first component, wherein the assembler is further configured to assemble a different version of the application based on a different version of the master application component and the different version of the first component.

8. The computing device of claim 7, further comprising:
a master application component retriever stored in the memory and configured to retrieve the first version of the master application component based on version data that associates the first version of the master application component with the first version of the application.

9. The computing device of claim 7, further comprising:
a retriever stored in the memory and configured to retrieve data associated with one or both of the first version of the master application component and the corresponding version of the first component, wherein the data retrieved includes data representing one or more of a component identifier, a component type, a component version, and component associated metadata.

10. The computing device of claim 7, further comprising:
a transmitter stored in the memory and configured to transmit a data update that includes a difference between the first version of the application and the different version of the application to a computing device, wherein the data update includes less than an entirety of the different version of the application.

11. The computing device of claim 7, wherein validation of components is conducted along a modified dependency branch of components.

12. The computing device of claim 7, wherein the different version of the application includes components of an unmodified dependency branch of the first version of the application, and assembling the different version of the application further is based on the components of the unmodified dependency branch.

13. One or more tangible processor-readable storage media embodied with instructions for executing on one or more processors and circuits of a communication device a process for managing versions of an application, the process comprising:
assembling a first version of the application based on a first version of a master application component, a relationship operable to relate the first version of the master application component with a corresponding version of a first component on which the master application component depends for a function of the application, and the corresponding version of the first component;
determining a difference between the different version of the application and the first version of the application, wherein the difference includes the different version of the first component, the different version of the first component including metadata associated with the different version of the first component;
storing the metadata associated with the different version of the first component with a reference to the different version of the first component and a corresponding reference to the different version of the master application component;
storing a second relationship, wherein the second relationship is operable to relate the different version of the first component with the different version of the master application component, wherein assembling the different version of the application is further based on the second relationship;
validating, using a graphical representation of the application, that a different version of the first component functions with the application based on metadata associated with the different version of the first component; and
assembling a different version of the application based on a different version of the master application component and the different version of the first component.

14. The one or more tangible processor-readable storage media of claim 13, wherein the process further comprises:

retrieving the first version of the master application component based on version data that associates the first version of the master application component with the first version of the application.

15. The one or more tangible processor-readable storage media of claim 13, wherein the process further comprises:
retrieving data associated with one or both of the first version of the master application component and the corresponding version of the first component, wherein the data retrieved includes data representing one or more of a component identifier, a component type, a component version, and component associated metadata.

16. The one or more tangible processor-readable storage media of claim 13, wherein the process further comprises:
transmitting a data update that includes a difference between the first version of the application and the different version of the application to a computing device, wherein the data update includes less than an entirety of the different version of the application.

17. The one or more tangible processor-readable storage media of claim 13, wherein validating of components is conducted along a modified dependency branch of components.

18. The one or more tangible processor-readable storage media of claim 13, wherein the different version of the application includes components of an unmodified dependency branch of the first version of the application, and assembling the different version of the application further is based on the components of the unmodified dependency branch.

* * * * *